United States Patent
Brobston et al.

(10) Patent No.: US 7,466,972 B2
(45) Date of Patent: Dec. 16, 2008

(54) SYSTEM AND METHOD FOR OPTIMIZED RECEIVER PERFORMANCE IN A LOW INTERMEDIATE FREQUENCY ARCHITECTURE FOR EDGE

(75) Inventors: Michael L. Brobston, Allen, TX (US); Lup Meng Loh, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 11/708,850

(22) Filed: Feb. 21, 2007

(65) Prior Publication Data
US 2007/0149158 A1 Jun. 28, 2007

Related U.S. Application Data

(63) Continuation-in-part of application No. 11/326,124, filed on Jan. 5, 2006.

(51) Int. Cl.
*H04B 1/18* (2006.01)
(52) U.S. Cl. .................................. 455/296; 455/324
(58) Field of Classification Search .................. None
See application file for complete search history.

(56) References Cited

U.S. PATENT DOCUMENTS

| 7,203,476 | B2* | 4/2007 | Ruelke et al. ............... 455/324 |
| 2001/0040932 | A1* | 11/2001 | Lindquist et al. ............ 375/346 |
| 2002/0151289 | A1* | 10/2002 | Rahman et al. .......... 455/232.1 |
| 2008/0153447 | A1* | 6/2008 | Cowley et al. .............. 455/296 |

* cited by examiner

*Primary Examiner*—Thanh C Le

(57) ABSTRACT

The present disclosure relates generally to systems and methods for optimized receiver performance in a low intermediate frequency (IF) architecture for EDGE (Enhanced Data rates for GSM Evolution). In one example, a method includes mixing a received analog signal with a local oscillator signal to create a mixed signal having an intermediate frequency between 101 kHz and 199 kHz. The mixed signal is compensated to minimize a direct current (DC) component introduced into the mixed signal by the local oscillator signal and an interferer image portion of the mixed signal is rejected. DC introduced into the mixed signal is minimized before final downconverting of the mixed signal, and DC remaining at the intermediate frequency after downconverting the mixed signal is minimized.

20 Claims, 6 Drawing Sheets

SYSTEM AND METHOD FOR OPTIMIZED RECEIVER PERFORMANCE IN A LOW INTERMEDIATE FREQUENCY ARCHITECTURE FOR EDGE

CLAIM OF PRIORITY

This application is a continuation-in-part of U.S. patent application Ser. No. 11/326,124, filed on Jan. 5, 2006, and entitled "Versatile system for multimode, wireless communication receiver with ZIF and Near-ZIF operations", which claims priority to U.S. Provisional Patent No. 60/653,780, filed on Feb. 17, 2005, and entitled "Mobile Terminal Multi-Mode Common Core Receiver with Configurable Direct Downconversion and Near-ZIF Architecture", both of which are hereby incorporated by reference in their entirety.

BACKGROUND

Increasing demand for more powerful and convenient data and information communication has spawned a number of advancements in communications technologies, particularly in wireless communication technologies. A number of technologies have been developed to provide the convenience of wireless communication in a variety of applications, in various locations. This proliferation of wireless communication has given rise to a number of manufacturing and operational considerations.

There are an increasing number of fixed and portable wireless applications that require, or can benefit from, operation in accordance with a plurality of communications standards or operational protocols. This is commonly referred to as multi-mode operation. Multi-mode capabilities in wireless communication products allow end-users to purchase a single product that may be used in a variety of locations for a reasonable length of time, despite any proliferation of or changes in new technologies or standards. Multi-mode capabilities across wireless networks allow providers to offer new, advanced services to a broader range of customers while fulfilling the needs of their legacy customer base. Thus, wireless base stations and mobile devices need to support portions of emerging standards, as well as revenue producing existing standards for backward compatibility.

Consider, for example, EDGE (Enhanced Data rates for GSM Evolution) technology that evolved from GSM. Improvements in system and circuit design are needed to stay competitive in supporting the more stringent EDGE standard which, in this case, is a higher order modulation scheme in 8PSK (8 Phase-Shift Key) as opposed to the GMSK (Gaussian Minimum Shift Keying) modulation scheme used in the GSM-only standard. As always, the expense of any hardware re-design is inhibiting.

Accordingly, there is a need for a system design adjustment that can allow the same reconfigurable receiver used in GSM to perform competitively in EDGE without a hardware re-design.

SUMMARY

In one embodiment, a near zero intermediate frequency wireless system is provided. The system comprises an input configured to receive an analog signal and a mixer coupled to the input and configured to mix the analog signal with a local oscillator signal to create a mixed signal having a low intermediate frequency of between 101 kHz and 199 kHz, wherein a direct current (DC) compensation technique applied at an output of the mixer minimizes a DC component introduced into the mixed signal at least partly by the local oscillator signal. A first filter is coupled to the mixer and configured to minimize an interferer portion of the mixed signal and a second filter is coupled to a variable gain amplifier (VGA) positioned after the first filter, wherein the second filter is configured to further minimize the interferer portion of the mixed signal. The system includes means for digitizing the mixed signal and means for performing DC compensation and downconversion on the mixed signal, wherein the DC compensation is performed prior to the downconversion. A third filter is coupled to the means for performing DC compensation and downconversion, wherein the third filter is configured to minimize DC remaining at the low intermediate frequency after the signal is downconverted.

In another embodiment, a method for use in a near zero intermediate frequency wireless architecture is provided. The method comprises receiving an analog signal and mixing the received analog signal with a local oscillator signal to create a mixed signal having a low intermediate frequency between approximately 125 kHz and 145 kHz. The mixed signal is filtered to minimize a direct current (DC) component introduced into the mixed signal by the local oscillator signal. The mixed signal is converted from an analog signal to a digital signal. An interferer image portion of the mixed signal is rejected. DC introduced into the mixed signal is minimized and the mixed signal is downconverted. DC remaining at the intermediate frequency after the signal is downconverted is minimized.

In still another embodiment, a method for a near zero intermediate frequency wireless device is provided. The method comprises mixing a received analog signal with a local oscillator signal to create a mixed signal having an intermediate frequency between 101 kHz and 199 kHz. The mixed signal is compensated to minimize a direct current (DC) component introduced into the mixed signal by the local oscillator signal and an interferer image portion of the mixed signal is rejected. DC introduced into the mixed signal is minimized before final downconverting of the mixed signal and DC remaining at the intermediate frequency is minimized after downconverting the mixed signal.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
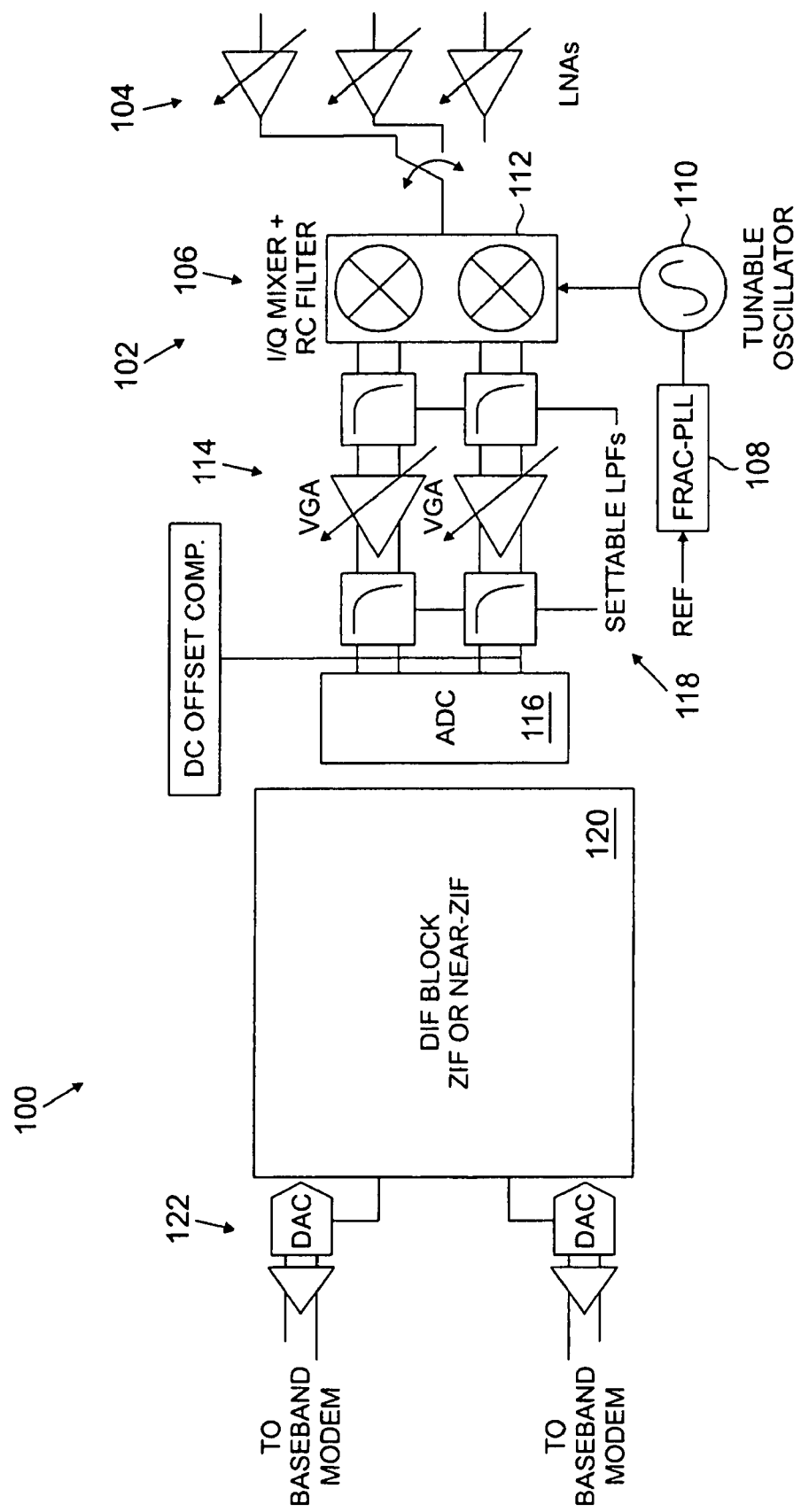
FIG. 1 illustrates one embodiment of wireless communications receiver system in accordance with the present disclosure.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
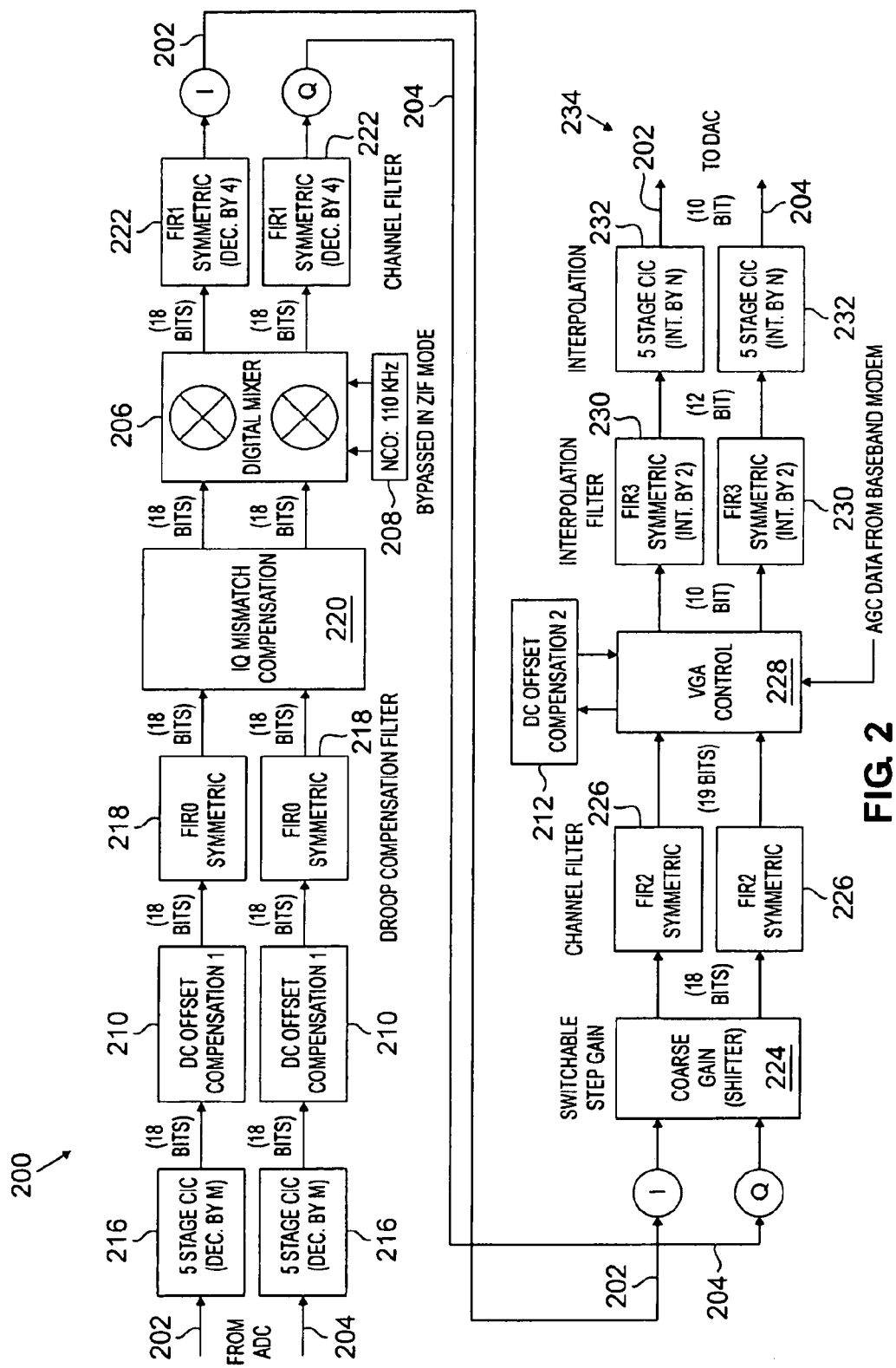
FIG. 2 illustrates an embodiment of a multi-mode signal processing segment in accordance with the present disclosure.

FIGS. 1 and 2, discussed below, and the various embodiments used to describe the principles of the present disclosure in this document are by way of illustration only and should not be construed in any way to limit the scope of the disclosure. Those skilled in the art will understand that the principles of the present disclosure may be implemented in any suitably arranged receiver structure, whether such structure relies upon ZIF, NZIF or some other desired operational protocols.

The following discloses a system design that reaches various compromises with respect to technical design challenges to achieve competitive performance in EDGE by selecting an IF frequency plan using a highly reconfigurable receiver.

The system of the present disclosure provides a mobile terminal receiver architecture that can be conveniently reconfigured by software to optimize performance for GSM/EDGE by selecting a low intermediate frequency (IF) that mitigates design challenges. According to the present disclosure, and as illustrated now in reference to FIG. 1, a multimode receiver component 100 comprises an analog radio frequency (RF) front-end segment 102, having a low noise amplifier segment 104 and a down-conversion segment 106. In order for segment 106 to successfully accommodate two or more different down-conversion schemes, a local oscillator (LO) for down-converter segment 106 needs to be highly versatile and adaptable.

In response, the system of the present disclosure provides a programmable synthesizer component 108 (e.g., a phase-locked loop (PLL) based device, either fractional or integer based) in conjunction with a widely tunable oscillator element 110. Element 110 then feeds a mixer/demodulation element 112. Element 112 provides complex downconversion functionality needed for image rejection when operating in NZIF. The present system recognizes that since the difference in IF frequency operation is relatively small (e.g., from about 100 kHz to about 200 kHz), this is not an inhibiting design challenge for such an element.

The rest of analog segment 102 comprises an analog variable gain amplifier (VGA) block 114, and an analog-to-digital converter (ADC) block 116 to digitize signals being processed. Programmable low-pass filters 118 (LPFs) are implemented at the output portion of both the down converter block 106 and VGA block 114, to provide blocking and anti-aliasing functions. From these segments, signals pass to the DIF construct 120, which processes those signals in digital domain (as described hereinafter) before outputting the signals to a baseband modem (not shown) via digital to analog converter (DAC) elements 122.

Referring now to FIG. 2, one illustrative embodiment of a DIF construct 200 in accord with the present disclosure is depicted. Construct 200 may be provided, for example, for multimode utilization with programmable capability to support various Low-IF frequencies in Zero-IF for narrowband applications like GSM/EDGE. Construct 200 may be provided such that it uses the same data bus and width for all supported IF frequencies.

Construct 200 further comprises an IF to baseband digital mixer element 206. Mixer element 206 is utilized for NZIF operation, as driven by a numerically controlled oscillator (NCO) 208.

A DC offset correction element 210 is also provided. DC offset correction 210 is utilized in NZIF operation but may not be needed at an IF frequency of 170 kHz or above.

As signals are introduced to construct 200 via inputs 214, a signal may first be processed by a first filtering element 216, prior to any offset compensation performed by element 210. As depicted in FIG. 2, filtering element 216 comprises a cascaded integrator-comb (CIC) type of filter. The specific topology and magnitude of element 216 may be varied to match design requirements of a given application. As depicted in FIG. 2, element 216 comprises a 5-stage CIC filter. Filter 216 has a programmable decimation rate (M) that may be provided or determined based on the incoming ADC rate.

From element 216, signal proceeds through offset compensation 210, and may then be filtered again by second filtering element 218 before proceeding to a mismatch compensation element 220. As depicted in FIG. 2, element 218 comprises a symmetric finite impulse response (FIR) type filter, providing droop compensation of prior analog LPFs 118 or CIC filter 216. After compensation by element 218, signal proceeds through mismatch compensation 200 to mixer element 206. After processing by element 206, signal may then proceed through a channel filtering element 222 before processing by a gain adjust element 224. As depicted in FIG. 2, element 222 comprises a symmetric FIR type filter.

Element 224 provides a coarse gain adjustment (i.e., switchable step gain), from which signal may then proceed through another channel filtering element 226, before proceeding to variable gain amplification (VGA) element 228. As depicted in FIG. 2, element 226 also comprises a symmetric FIR type filter. Once signal has been processed through VGA element 228, it may then proceed through one or more forms of interpolation filter elements 230, 232, before being output 234 from construct 200. As depicted in FIG. 2, element 230 comprises a symmetric FIR type interpolation filter, while element 232 comprises a 5-stage CIC interpolation component. Element 232 has a programmable interpolation rate (N) that may be determined or provided based upon the rate of a DAC to which signals are output 234. If the modem supports a digital baseband interface, the DAC is not required.

VGA element 228 may be provided to maintain some nominal signal level into a baseband modem from output 234. Digital channel filtering elements 222 and 226 may be provided in a programmable format or configuration, enabling those elements to be reconfigurable or optimizable for signals in different modes with various bandwidths. The FIR filters of those elements may be designed to attenuate close-in blockers, including adjacent channel interferers, in GSM/EDGE, as well as any up-converted residual DC spurious noise from use of an NCO. These filters may also be designed or configured to perform amplitude equalization on frequency responses from, for example, analog low pass filters at the output of down-converter and VGA 228 output, to address any amplitude droop effect on a signal from being at a non-zero IF frequency.

In most embodiments, both ZIF and NZIF configurations are provided without any image rejection filtering. As such, image rejection is of particular concern in NZIF operation. For example, a minimum of about 35 dB of image rejection may be required when operating in GSM/EDGE mode, with an NZIF configuration. Given certain tolerances in I/Q mismatch, complex filtering in the digital domain is a preferable approach, and more deterministic in image reduction, which would otherwise be very challenging to provide in the analog domain.

Given the versatility of the present system, a number of application-specific or general-purpose adaptations may be readily implemented. For example, a receiver synthesizer may be exploited to adopt an NZIF configuration at greater than 130 kHz for GSM/EDGE, providing room for the FIR filters of construct 200 to block out any upcoverted DC spurs that may occur at 130 kHz, since baseband require signal bandwidth for EDGE processing may be greater than 100 kHz. In some instances, it may be possible that analog filter bandwidth may be constrained by amplitude droop or group delay effects on a signal, while at the same time maintaining selectivity. Advantageously, NZIF arrangement of construct 200 is not required to perform any digital DC correction if the IF is high enough (e.g., 170 kHz or above), since any upcoverted residual DC component may be sufficiently filtered out, and digital functional blocks can be conceptualized as being perfectly linear.

Another advantage of an NZIF arrangement of the present invention is that, in a narrowband system like GSM/EDGE, a high-pass transfer function of an analog DC correction loop will induce little to no degradation of a signal, especially if an IF of greater than 135 kHz is used. This provides more accurate corrections with the receiver fully turned on and the dynamics of high signals and blockers, allowing for IM2 product reduction during active burst for better AM suppression.

Some telecommunications technologies, such as GSM, are generally regarded as narrow-band, second generation (2G) technologies. As such, digital signal processing (DSP) modems and similar components in narrow-band systems are directed to using frequencies (e.g., intermediate frequencies) suitable for such technologies. However, the introduction of improvements, such as higher speed data transmission introduced with EDGE technology, present challenges for components designed for GSM frequency ranges. It is understood that GSM and EDGE are used as examples and that the present disclosure is not limited to GSM and EDGE technologies.

Figure 3:
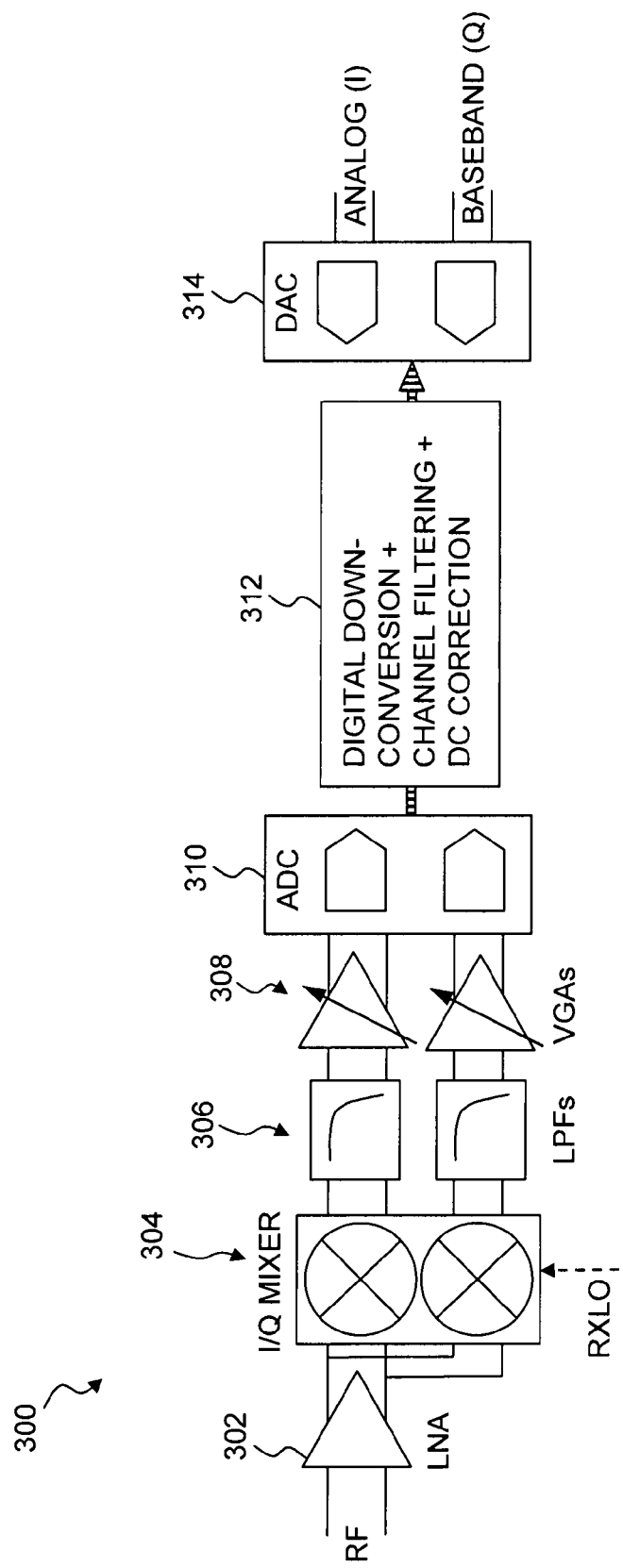
FIG. 3 illustrates another embodiment of wireless communications receiver system in accordance with the present disclosure.

Referring to FIG. 3, a block diagram illustrates one embodiment of a circuit 300 that may be used to implement aspects of the present disclosure. In the present example, the circuit 300 includes an NZIF receiver architecture designed to operate with a low IF of approximately 135 kHz for EDGE and other applications having higher bandwidth requirements than GSM. It is understood that the circuit 300 may be adapted for other technologies, and may be configured to operate with an IF between approximately 100.1 and 199.9 kHz. For example, in some embodiments, the IF may be between approximately 125 kHz and 145 kHz. In some embodiments, the circuit 300 may be used to accommodate two or more different down-conversion schemes, such as ZIF and NZIF, as described with respect to FIGS. 1 and 2.

The circuit 300 includes an RF input that may enter the circuit 300 via a low noise amplifier (LNA) 302. After amplification (if any), the signal may be passed into an IQ mixer/filter 304. A local oscillator (LO) input, such as that described with respect to FIGS. 1 and 2, may be an input into the IQ mixer/filter 304. From the I/Q mixer/filter 304, the signal may pass through one or more programmable low-pass filters (LPFs) 306 and one or more variable gain amplifiers (VGAs) 308 into an analog-to-digital converter (ADC) block 310 that may digitize the incoming signals. From the ADC block 310, the signals may pass through a block 312 that may perform digital downconversion, channel filtering, and DC correction. After leaving the block 312, the signals may pass through a digital-to-analog converter (DAC) block 314, resulting in a processed analog output (I) and a baseband output (Q). Various elements of the circuit 300, such as the block 312, may be similar or identical to the corresponding elements described with respect to FIGS. 1 and 2.

In selecting a particular IF for the circuit 300 from the range of approximately 100.1 to 199.9 kHz, various issues may be considered. Generally, DSP modems that are designed for traditional GSM frequency ranges may be unsatisfactory for higher bandwidth technologies like EDGE. For example, a conventional DSP modem for a GSM device may be designed with a 100 kHz IF that is sufficient for GSM, but not for the higher bandwidth needs of EDGE. In such cases, the maximum bandwidth for a 100 kHz IF may be approximately 200 kHz, while EDGE needs more bandwidth than 200 kHz. Some solutions have moved the IF to 200 kHz, but this may introduce other design challenges, such as overcoming difficulties introduced by blocking frequency requirements used in image rejection.

Two factors may be considered when identifying a value for the IF setting of the circuit 300: DC correction and image rejection. As is known, DC correction addresses the issue of converging on the DC offset component of a signal in order to marginalize or eliminate interference caused by the DC offset. Such correction is generally performed by compensation loops with a high-pass response, which may be analog or digital. The design of DC correction filters generally attempts to balance the rapidity with which DC convergence occurs with an amount of the signal being lost. For example, a higher pass response required for faster convergence attenuates more of the desired signal at a fixed Near IF frequency. This pass band is generally defined by −3 dB with reference to the passband amplitude (sometimes referred to as the "3 dB corner"). If the DC correction converges relatively quickly, a portion of the signal will reside at less than −3 dB of the high pass response and will be attenuated. The more quickly the DC correction converges, the more signal loss may be experienced. If the DC correction converges relatively slowly, then all of the signal will reside at greater than −3 dB of the high pass response and will be relatively well maintained, but there is more interference as the DC offset is not corrected as quickly as with a more rapid DC convergence. Accordingly, DC correction design is often a balance between achieving a satisfactory DC convergence with minimum signal loss. Using a higher IF may enable faster DC correction while minimizing signal loss.

The other factor that may be used for identifying a value for the IF setting is image rejection. As is known, an image in this context is the result of an undesired band produced by an input frequency that is capable of producing the same IF that the desired input frequency produces. This unwanted image generally mirrors the desired image on the opposite side of the LO frequency. NZIF architectures commonly deal with image rejection by downconverting with a complex image-reject mixer. Such a task may be relatively straightforward for an IF at 100 kHz, because the image blocker is only 9 dB above the desired signal level per the 3GGP specification to contend with a 200 kHz offset from the carrier signal. However, in EDGE and other architectures where a higher IF is needed, the image blocker can be 41 dB above the desired signal level to deal with a 400 kHz offset from the carrier blocker. As such, an IF of 200 kHz may need image rejection well above 60 dB, which may place relatively strict requirements on IQ imbalances and compensation techniques. As such, image blocking may benefit from a lower IF as this moves the desired passband further away from the 400 kHz interferer image and reduces image rejection requirements. Accordingly, while DC correction may benefit from a higher IF, image rejection may benefit from a lower IF, and the selection of an IF for a particular circuit may include identifying a balance between DC correction and image rejection.

Figure 4:
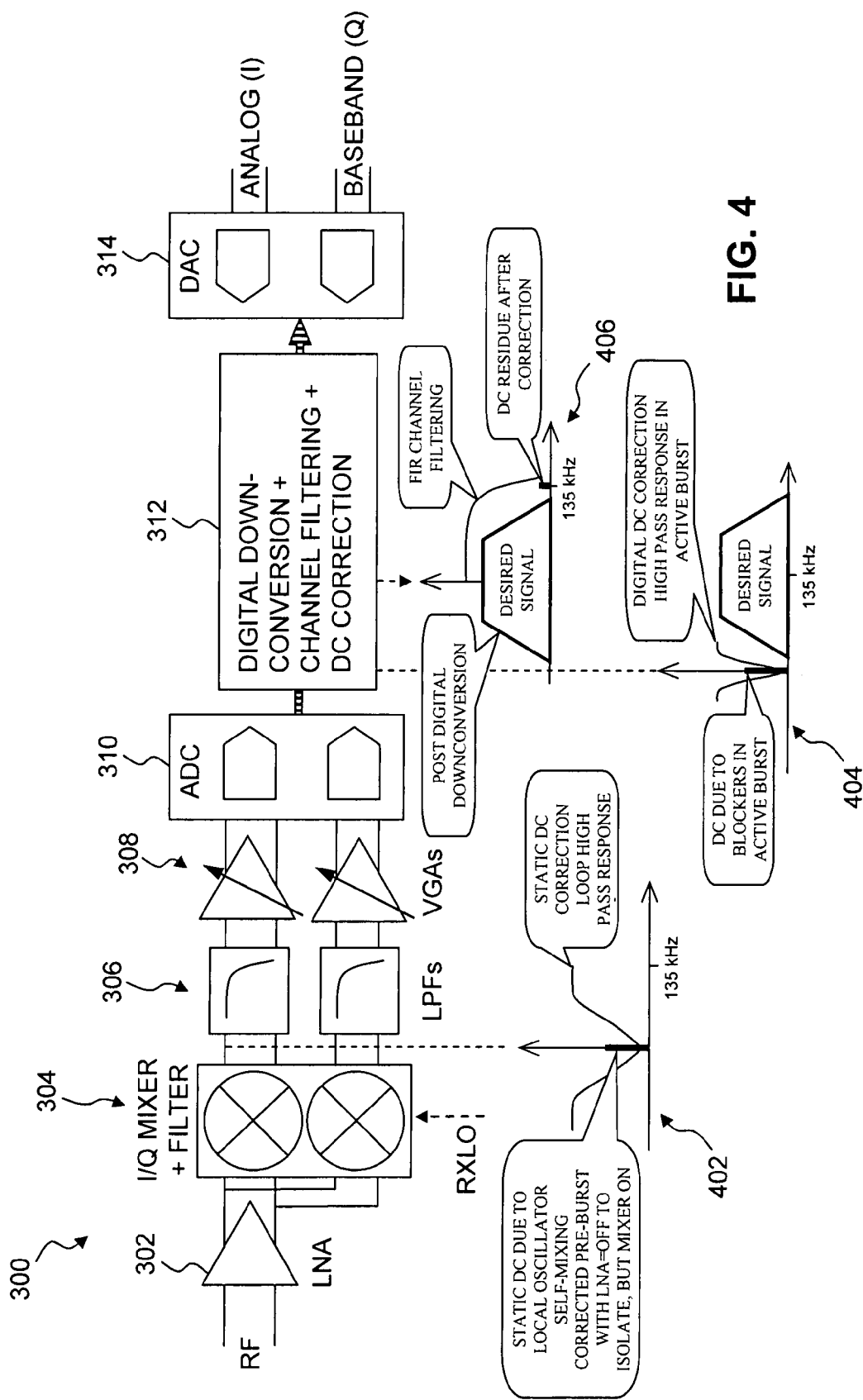
FIG. 4 illustrates a sequence of events demonstrating one embodiment of signal processing using the wireless communications receiver system of FIG. 3.

With additional reference to FIG. 4, a sequence of various compensation processes on DC residue in a signal processed by the circuit 300 of FIG. 3 is illustrated using graphs 402, 404, and 406. Each graph is associated with a portion of the circuit 300 where the graph is applicable. In the present example, the circuit 300 is designed with an IF of approximately 135 kHz, although it is understood that the IF may vary between approximately 100.1 and 199.9 kHz in other embodiment. The sequence moves from the RF input into the LNA 302 to the analog and baseband outputs from the DAC 314. It is understood that the graphs 402, 404, and 406 are intended only to illustrate the compensation processes, and are not meant to be precise mathematical representations.

The use of a NZIF receiver architecture at 135 kHz for the circuit 300 enables the circuit to effectively handle EDGE operations. As described previously, EDGE processing at the DSP modem generally needs a 3 dB RF bandwidth signal in excess of the standard 200 kHz channel spacing provided by the 100 kHz IF used in traditional GSM circuits, although it is understood that the actual required bandwidth may vary from modem to modem. The use of an IF higher than 100 kHz affords a DC correction loop high-pass response of 5 kHz while still allowing up to a 250 kHz 3 dB full EDGE spectrum (indicated by graph 402). As illustrated in graph 402, the static DC correction loop high-pass response minimizes a DC component introduced by the LO while maintaining the information in the incoming signal. As such, dynamic DC offset correction can remain in effect during the active burst to minimize DC due to blockers, while maintaining full signal integrity for EDGE processing (indicated by graph 404). This is consistent with the objective for a NZIF architecture to support a modem ADC with lesser dynamic range. In contrast, a traditional IF at 100 kHz is not able to support any DC compensation during the active bursts for EDGE, and therefore provides no advantage over ZIF.

In a NZIF architecture, the second down-conversion to baseband may be achieved in the digital domain. The architecture of the circuit 300 with an IF of 135 kHz may result in any DC residue being upconverted by this digital downconverter to reside at 135 kHz in baseband, affording further rejection by digital channel filtering (indicated by graph 406). Therefore, with the combination of pre-burst DC correction, active burst DC correction, and digital channel filtering facilitated by the 135 kHz NZIF architecture of the circuit 300, the impact from any statically or dynamically generated DC is minimized.

Figure 5B:
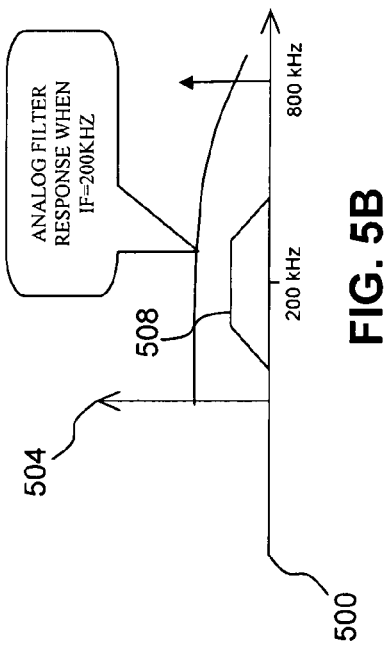
FIGS. 5A-5D are graphs illustrating differences between an intermediate frequency of 200 kHz and an intermediate frequency of 135 kHz.
Figure 5D:
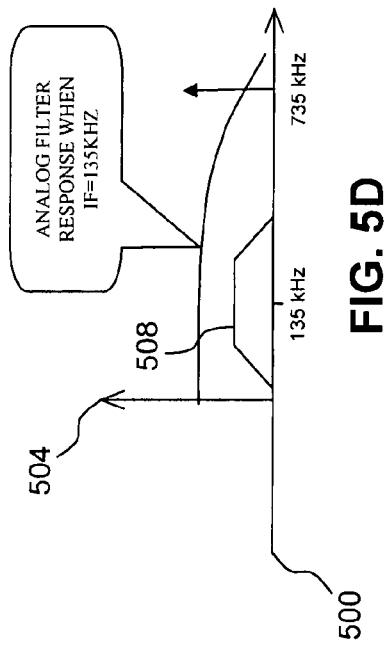
Figure 5A:
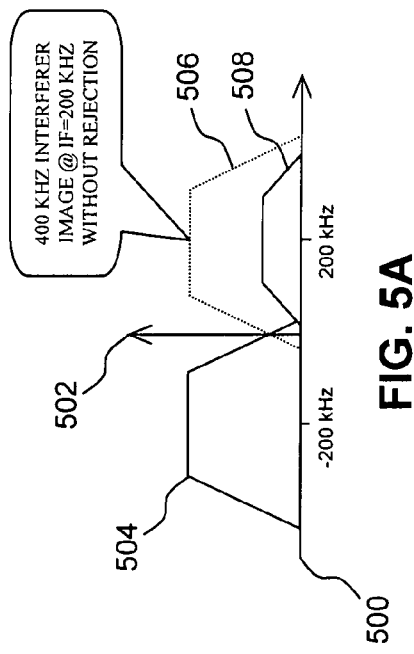
Figure 5C:
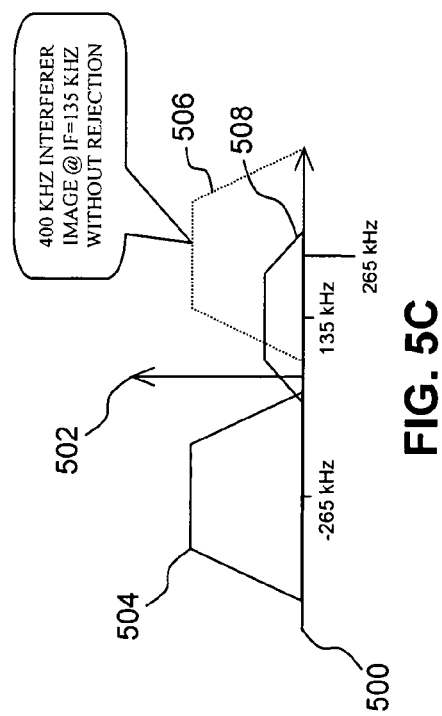

With reference to FIGS. 5A-5D, graphs 5A and 5B illustrate the use of an IF of 200 kHz, and graphs 5C and 5D illustrate the use of an IF of 135 kHz. In FIG. 5A, an x-axis 500 represents frequency and a y-axis 502 at DC. A complex downconverted interferer 504 is mirrored by its image 506. The desired signal 508 illustrates how the 400 kHz interferer image dominates without image rejection. As can be seen in FIG. 5A, the interferer image 506 may overwhelm the desired signal 508 in the case of Low-IF=200 kHz, making it challenging to reject the interferer image by such a large magnitude. FIG. 5B shows that in order to maintain reasonable lowpass filter droop within the desired signal at Low-IF=200 kHz, the filter rejection of a 600 kHz interferer is less as compared with FIG. 5D, where the Low-IF=135 kHz is used. Using Low-IF=135 kHz shows in FIG. 5C that there is less overlap from the same 400 kHz interferer image on the desired signal. As such, less image rejection is required to meet signal to noise performance compared with FIG. 5A.

Accordingly, in contrast to the 200 kHz IF used in some EDGE applications, the IF of 135 kHz in the present example provides a balance between analog channel filtering (e.g., DC correction) and image rejection. The use of an IF of 135 kHz may also provide benefits due to design requirements such as cost and the technical feasibility of a particular configuration (e.g., filter limitations). As described previously, as opposed to an IF of 200 kHz, corruption from a 400 kHz offset image may be significantly reduced in the case of a 135 kHz IF. As such, the image rejection requirement is less and IQ imbalance limits may be relaxed. As an example, a 0.2 dB and a 1.5 degree IQ gain and phase imbalance, respectively, yields an IQ mixer image rejection of −35 dB. With the help of channel filtering, this is sufficient to meet a 400 kHz adjacent interferer specification. Such IQ imbalance limits may be achieved with proper compensation and a carefully designed circuit layout. Besides a much stiffer image rejection requirement, the use of a 200 kHz IF (i.e., in contrast to a 135 kHz IF) may also present additional challenges in designing an analog filter design prior to the ADC that is capable of simultaneously achieving sufficient rejection of blockers to avoid ADC saturation and $3^{rd}$ order intermodulation products, as well as risking a higher group delay ripple with a tight 3 dB corner.

Figure 6:
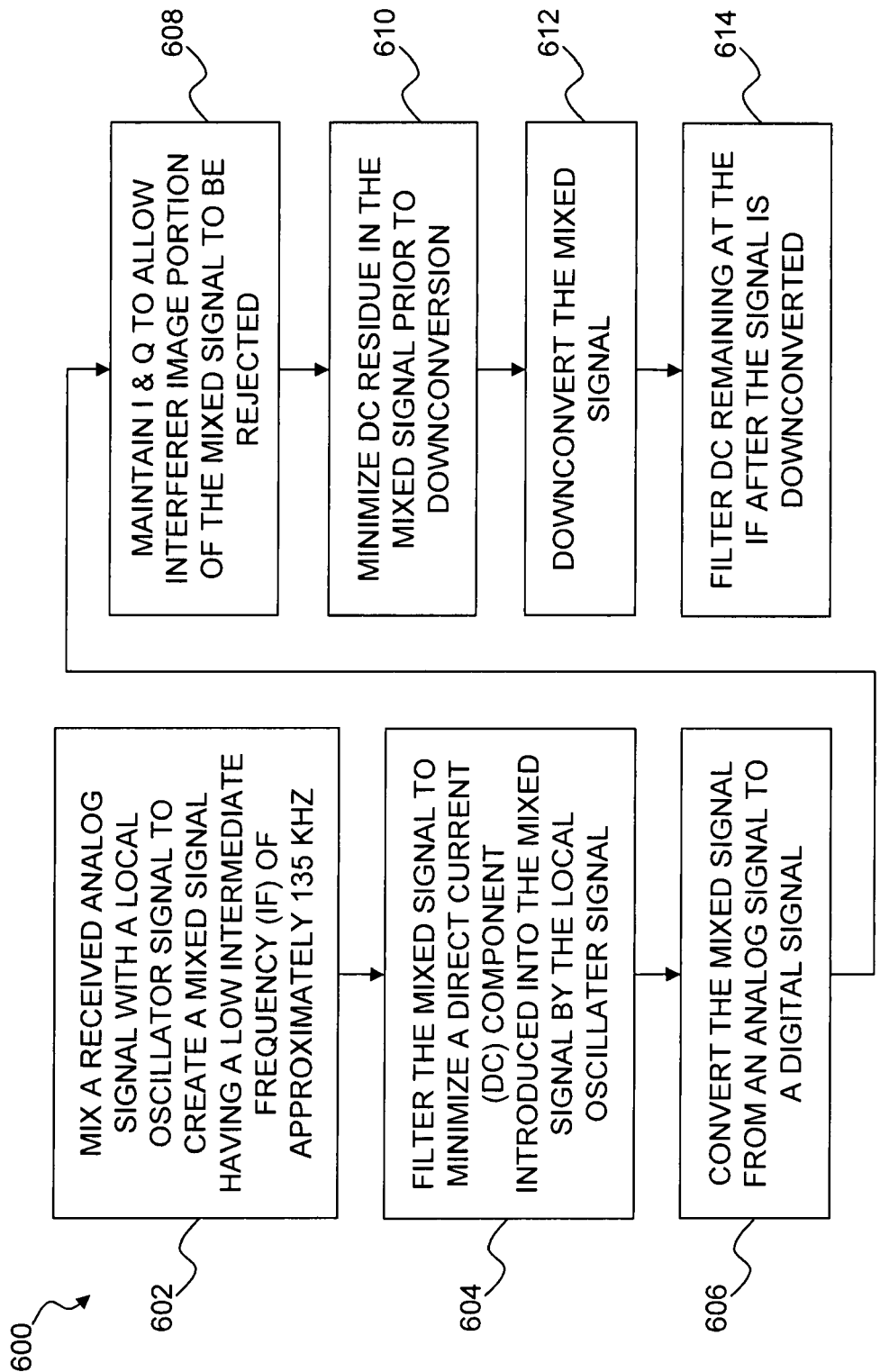
FIG. 6 is a flowchart illustrating one embodiment of a method that may be executed within the wireless communications receiver system of FIG. 3.

Referring to FIG. 6, in one embodiment, a method 600 may be used with a NZIF wireless architecture, such as the circuit 300 of FIG. 3. For example, the method 600 may be executed to perform the sequence of compensation processes illustrated in FIG. 4. Although the method 600 is illustrated using a low-IF of approximately 135 kHz, it is understood that the method may be implemented using an IF between 100.1 and 199.9 kHz.

In step 602, a received analog signal is mixed with a local oscillator signal to create a mixed signal having a low-IF of approximately 135 kHz. In step 604, the mixed signal is compensated to minimize a DC component introduced into the mixed signal by the local oscillator signal. In the present example, the mixed signal is converted from an analog signal to a digital signal in step 606. In step 608, an interferer image portion of the mixed signal is rejected. DC is further minimized in step 610 prior to downconversion. The mixed signal is downconverted in step 612. In step 614, DC remaining at the IF after the signal is downconverted is filtered or eliminated.

It should now be appreciated by one of skill in the art that the system of the present disclosure provides flexibility in NZIF applications, allowing compromises in design in order to achieve competitive EDGE performance. The relative arrangement and orientations of certain filtering or compensation elements may be provided in any manner suitable for a particular application. All such variations and modifications are hereby comprehended. It should also be appreciated that the system of the present disclosure may be readily implemented in any desired design or fabrication processes. The constituent members or components of this system may be produced or provided using any suitable hardware, software, or combination of hardware and software.

What is claimed is:

1. A near zero intermediate frequency wireless system comprising:
   an input configured to receive an analog signal;
   a mixer coupled to the input and configured to mix the analog signal with a local oscillator signal to create a mixed signal having a low intermediate frequency of between 101 kHz and 199 kHz, wherein a direct current (DC) compensation technique applied at an output of the mixer minimizes a DC component introduced into the mixed signal at least partly by the local oscillator signal;
   a first filter coupled to the mixer and configured to minimize an interferer portion of the mixed signal;
   a second filter coupled to a variable gain amplifier (VGA) positioned after the first filter, wherein the second filter is configured to further minimize the interferer portion of the mixed signal;
   means for digitizing the mixed signal;
   means for performing DC compensation and downconversion on the mixed signal, wherein the DC compensation is performed prior to the downconversion; and
   a third filter coupled to the means for performing DC compensation and downconversion, wherein the third filter is configured to minimize DC remaining at the low intermediate frequency after the signal is downconverted.

2. The system of claim 1 wherein the low intermediate frequency is between approximately 125 kHz and 145 kHz.

3. The system of claim 2 wherein the low intermediate frequency is at approximately 135 kHz.

4. The system of claim 1 further comprising an analog to digital converter configured to convert the mixed signal from an analog signal to a digital signal.

5. The system of claim 4 wherein the analog to digital converter is positioned between the mixer and the first filter.

6. The system of claim 4 further comprising a digital to analog converter positioned after the fourth filter.

7. The system of claim 1 wherein the fourth filter is a finite impulse response filter.

8. The system of claim 1 wherein the first and third filters are high pass response filters.

9. The system of claim 1 further comprising a local oscillator configured to generate the local oscillator signal, wherein the local oscillator is configurable to generate a local oscillator signal at one of a plurality of selectable frequencies.

10. A method for use in a near zero intermediate frequency wireless architecture comprising:
    receiving an analog signal;
    mixing the received analog signal with a local oscillator signal to create a mixed signal having a low intermediate frequency between approximately 125 kHz and 145 kHz;
    filtering the mixed signal to minimize a direct current (DC) component introduced into the mixed signal by the local oscillator signal;
    converting the mixed signal from an analog signal to a digital signal;
    rejecting an interferer image portion of the mixed signal;
    minimizing DC introduced into the mixed signal;
    downconverting the mixed signal; and
    minimizing DC remaining at the intermediate frequency after the signal is downconverted.

11. The method of claim 10 wherein the low intermediate frequency is at approximately 135 kHz.

12. The method of claim 10 further comprising converting the mixed signal from the digital signal to an analog signal after minimizing DC remaining at the intermediate frequency after the signal is downconverted.

13. The method of claim 10 further comprising selecting a frequency of the local oscillator signal based on the intermediate frequency.

14. A method for a near zero intermediate frequency wireless device comprising:
    mixing a received analog signal with a local oscillator signal to create a mixed signal having an intermediate frequency between 101 kHz and 199 kHz;
    compensating the mixed signal to minimize a direct current (DC) component introduced into the mixed signal by the local oscillator signal;
    rejecting an interferer image portion of the mixed signal;
    minimizing DC introduced into the mixed signal before final downconverting of the mixed signal; and
    minimizing DC remaining at the intermediate frequency after downconverting the mixed signal.

15. The method of claim 14 wherein the low intermediate frequency is between approximately 125 kHz and 145 kHz.

16. The method of claim 15 wherein the low intermediate frequency is at approximately 135 kHz.

17. The method of claim 14 further comprising converting the mixed signal from the analog signal to a digital signal.

18. The method of claim 17 wherein converting the mixed signal to a digital signal occurs after filtering the mixed signal to minimize the DC component introduced into the mixed signal by the local oscillator signal.

19. The method of claim 17 further comprising converting the mixed signal from the digital signal to an analog signal.

20. The method of claim 19 wherein converting the mixed signal from the digital signal to the analog signal occurs after minimizing DC remaining at the intermediate frequency after downconverting the mixed signal.

* * * * *